United States Patent [19]

Eckardt

[11] Patent Number: 5,321,730
[45] Date of Patent: Jun. 14, 1994

[54] PROCESS AND DEVICE FOR OXIDATION OF HYDROGEN

[75] Inventor: Bernd Eckardt, Bruchköbel, Fed. Rep. of Germany

[73] Assignee: Siemens Aktiengesellschaft, Munich, Fed. Rep. of Germany

[21] Appl. No.: 991,756

[22] Filed: Dec. 16, 1992

[30] Foreign Application Priority Data

Jun. 21, 1990 [DE] Fed. Rep. of Germany ....... 4019832

[51] Int. Cl.$^5$ ................................................ G21C 9/06
[52] U.S. Cl. ..................................................... 376/301
[58] Field of Search .............................. 376/301, 300; 423/580.1, 580.2

[56] References Cited

U.S. PATENT DOCUMENTS 4,407,774 10/1983 Schretzmann et al. ............ 376/301

FOREIGN PATENT DOCUMENTS 0019907 12/1980 European Pat. Off. .
2922717 12/1980 Fed. Rep. of Germany .
3739720 6/1989 Fed. Rep. of Germany .

Primary Examiner—Daniel D. Wasil
Attorney, Agent, or Firm—Herbert L. Lerner; Laurence A. Greenberg

[57] ABSTRACT

A process for oxidation of hydrogen in a containment of a nuclear reactor plant with the aid of finely distributed catalyst particles, includes spraying catalyst particles in the form of a solution or suspension inside or outside the containment. The sprayed solution or suspension is subsequently dried by heating inside or outside the containment to produce aerosols. The aerosols produced outside are introduced into the containment. A device for oxidation of hydrogen in a containment of a nuclear reactor plant with the aid of finely distributed catalyst particles includes a container for receiving catalyst particles in the form of a solution or suspension. A distributor configuration is connected to the container for spraying the solution or suspension inside or outside the containment. A heater dries the sprayed solution or suspension before the solution or suspension is released into the containment.

22 Claims, 6 Drawing Sheets

PROCESS AND DEVICE FOR OXIDATION OF HYDROGEN

CROSS-REFERENCE TO RELATED APPLICATIONS

This application is a Continuation of International Application Serial No. PCT/DE91/00508, filed Jun. 20, 1991.

The invention relates to a process and a device for oxidizing hydrogen in the containment of a nuclear reactor plant with the aid of finely distributed catalyst particles.

In a process of the above-described type, which is known from German Published, Non-Prosecuted Application DE-OS 29 22 717, corresponding to Published European Application No. 0 019 907, a catalyst powder, which is kept as dry as possible, is blown with inert gas into the upper part of the containment, so that it will drop downward by gravity and thus engage the entire space. Due to the high forces of adhesion prevailing in the catalyst powder in the dry state, only relatively large agglomerates that are 3 to 10 $\mu$m in size, for instance, can be produced by such processes, even if complicated and expensive dispersing equipment is used. Such agglomerates rapidly settle, and because of the brief suspension times they lead to low hydrogen degradation rates. Moreover, in a humid atmosphere, the high flow velocities required to detach the agglomerates lead to high precipitation of the agglomerates and thus to catalytic deactivation.

It is accordingly an object of the invention to provide a process and a device for the oxidation of hydrogen, which overcome the hereinafore-mentioned disadvantages of the heretofore-known processes and devices of this general type and in which a highly effective superfine particle atmosphere with long suspension times is produced by simple means. Moreover, this should be catalytically effectively feasible in the containment atmosphere to be oxidized.

With the foregoing and other objects in view there is provided, in accordance with the invention, a process for oxidation of hydrogen in a containment of a nuclear reactor plant with the aid of finely distributed catalyst particles, which comprises spraying or atomizing catalyst particles in the form of a solution or suspension inside or outside a containment of a nuclear reactor plant; subsequently drying the sprayed solution or suspension by heating inside or outside the containment to produce aerosols; and introducing the aerosols produced outside into the containment.

In accordance with another mode of the invention, there is provided a process which comprises causing the aerosols to rise in the interior of the containment. This can be done in a continuous operation. The liquid for the suspension or solution and the temperature that are selected, and optionally additional drying of the aerosol atmosphere make it possible to adapt to any prevailing conditions, within wide limits.

The solution or suspension can be introduced into the containment through a plurality of nozzles, in order to provide a distribution in fine droplets from the very outset. Therefore, in accordance with a further mode of the invention, there is provided a process which comprises introducing the suspension or solution into the containment and spraying the suspension or solution, through at least one nozzle fed by a line. Especially if two-substance nozzles are used, suspension droplet collectives of from 3 to 30 $\mu$m can be produced, which dry, depending on the solid content of the suspension, which varies from 0.1 to 10%, in such a way as to produce highly mobile superfine aerosols in the range of 1 $\mu$m and less.

In accordance with an added mode of the invention, there is provided a process which comprises heating the suspension or solution before the spraying.

In accordance with an additional mode of the invention, there is provided a process which comprises producing suspension droplets having a statistical mean diameter of 3 to 30 $\mu$m and resultant solid aerosols of 0.1 to 2 $\mu$m containing the catalyst particles.

In accordance with yet another mode of the invention, there is provided a process which comprises releasing the aerosols in a superheated state at a velocity of less than 5 m/s in the containment.

In accordance with yet a further mode of the invention, there is provided a process which comprises catalytically superheating the aerosols.

By extensive calculation and practical experimentation with aerosol deposition or accumulation processes in test containments, it was possible to prove that the aerosols produced and distributed according to the invention precipitate out in the most varied atmospheres at degradation rates of only an average of 0.5 per hour. Releasing them at velocities of less than 5 m/s, particularly in the superheated atmosphere, makes it possible to largely avoid both an addition or attachment to other liquid droplets present in the containment and the formation of water envelopes around the aerosols. Due to this long aerosol suspension time (platinum particles having a diameter of less than 0.5 $\mu$m), it is possible with the process of the invention to achieve aerosol concentrations in the containment, even after one-half hour in operation, for instance, which, because of the large catalyst surface area and the short hydrogen diffusion paths, can lead to calculated hydrogen degradation rates of up to 1 kg/s and can thus contribute substantially to gaining control in the event of a malfunction. Catalyst deactivation from catalyst poisons can also be largely compensated for by continuous re-production of aerosols.

It is also possible to not produce the solution or suspension until directly before it is introduced into the containment, preferably after preheating. This averts long dwell times with the danger of undesired chemical or physical changes. This is also true if the solution or suspension is produced outside the containment, where charging and maintenance might generally be simpler.

An advantageous further feature of the invention provides that in terms of the quantity of suspension or solution sprayed or the concentration of the catalyst particles, the production of the solution or suspension is adjusted or regulated as a function of the hydrogen content in the containment. This makes it possible to minimize the expense for materials and energy, which may be important, especially in long-term operation.

In accordance with yet an added mode of the invention, there is provided a process which comprises heating with a thermal recombiner.

In accordance with yet an additional mode of the invention, there is provided a process which comprises producing the aerosol with a superheater catalyst by delivering aerosols containing catalyst particles to the superheater catalyst, and regenerating the superheater catalyst by accumulation of the catalytic aerosols.

In accordance with again another mode of the invention, there is provided a process which comprises producing the solution or suspension inside the containment immediately before spraying in the containment.

In accordance with again a further mode of the invention, there is provided a process which comprises adjusting the solution or suspension with a preheated liquid.

In accordance with again an added mode of the invention, there is provided a process which comprises producing the solution or suspension outside the containment.

In accordance with again an additional mode of the invention, there is provided a process which comprises heating with thermal ignition devices while spraying the solution or suspension in the containment.

In accordance with still another mode of the invention, there is provided a process which comprises producing the solution or suspension by adjusting one of the quantity of liquid being used and the concentration of the catalyst particles being used, as a function of the hydrogen content in the containment.

With the objects of the invention in view, there is also provided a device for oxidation of hydrogen in a containment of a nuclear reactor plant with the aid of finely distributed catalyst particles, comprising a container for receiving catalyst particles in the form of a solution or suspension; a distributor configuration connected to the container for spraying the solution or suspension inside or outside a containment of a nuclear reactor plant; and a heater for drying the sprayed solution or suspension before the solution or suspension is released into the containment.

In accordance with another feature of the invention, there is provided a a vertical tube having an upper end and having a lower end with an inlet opening formed therein; a cap disposed at the upper end; the upper end of the tube having lateral outlet openings formed therein below the cap; at least one propellant catalyst or a heater disposed in the inlet opening; and a nozzle mounted above the propellant catalyst or heater for receiving the solution or suspension.

In accordance with a further feature of the invention, there is provided a pressure vessel having a rupture membrane or bursting disk partitioning the pressure vessel into an upper part with a propellant gas or vapor cushion and a lower part with the solution or suspension, and a line connected between the tube and the lower part of the pressure vessel. The propellant gas cushion then forces the catalyst particles with the liquid through the tube, as soon as the outlet is uncovered, for instance by the opening of a valve.

In accordance with an added feature of the invention, there is provided a preheating container disposed above the propellant catalyst or heater for receiving a small quantity of suspension or solution. This is done in order to provide for rapid aerosol production, particularly upon startup.

In accordance with a concomitant feature of the invention, the distributor configuration has means for spraying the solution or suspension with solid aerosols having a mean diameter of 0.1 to 2 μm.

Other features which are considered as characteristic for the invention ar set forth in the appended claims.

Although the invention is illustrated and described herein as embodied in a process and a device for the oxidation of hydrogen, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
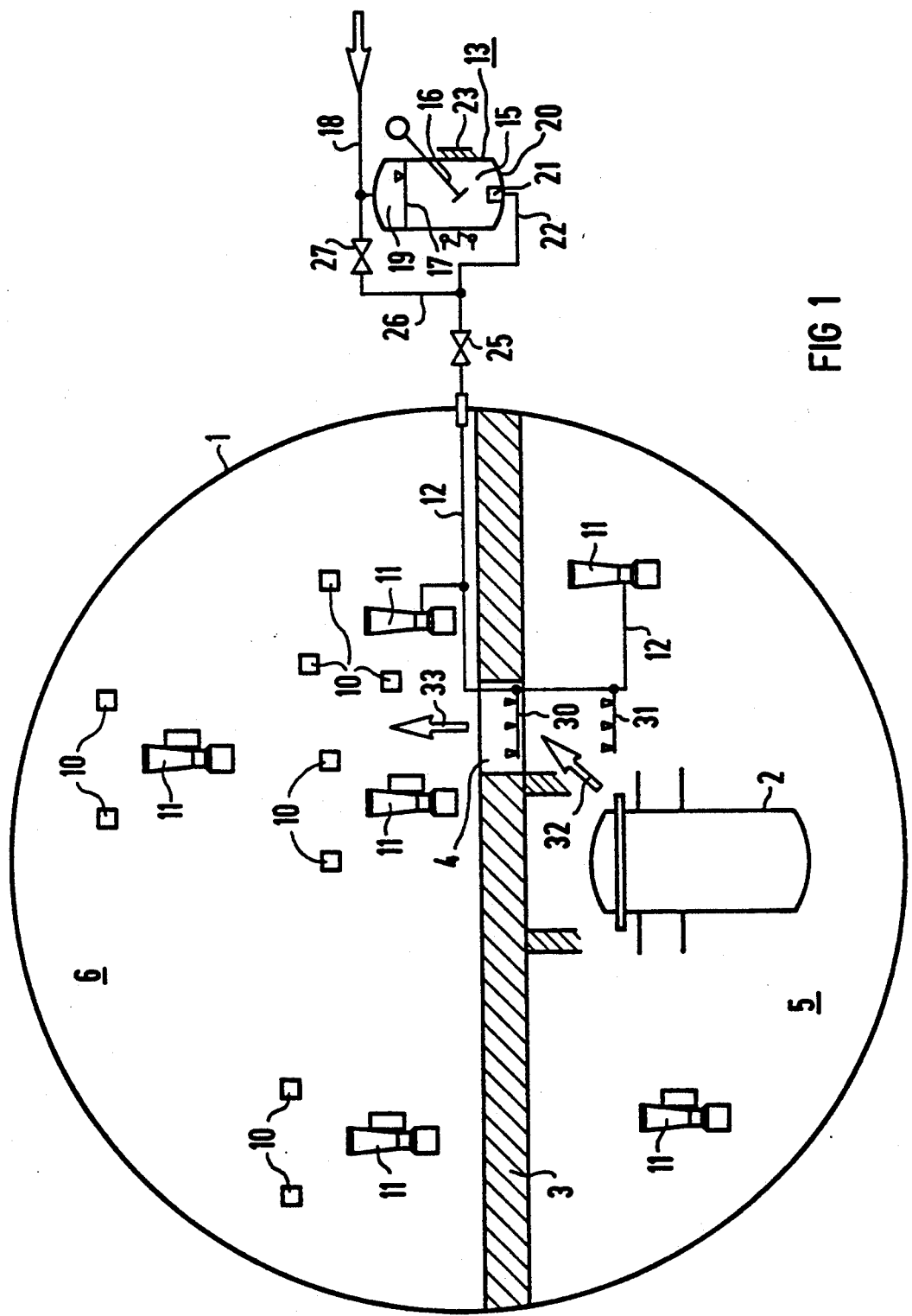
FIG. 1 is a diagrammatic vertical-sectional view of a containment of a nuclear reactor plant.

Referring now to the figures of the drawing in detail and first, particularly, to FIG. 1 thereof, there is seen a containment 1 made of steel or reinforced concrete, which is part of a nuclear reactor plant having a pressurized water reactor with a primary loop, of which only a reactor pressure vessel 2 is shown. The reactor pressure vessel 2 is mounted below a partition 3, in which an overflow opening 4 connects a lower part 5 with an upper part 6.

Three-dimensionally distributed ignition devices 10 are shown in the upper part 6. The ignition devices 10 assure the burn-off of hydrogen in a known manner if the local concentration exceeds the ignition limit of 4%. Such ignition devices 10, which may also be disposed in the lower part 5, are used to eliminate momentarily occurring hydrogen quantities, by tripping thermal or catalytic reactions.

A plurality of aerosol producers 11 are disposed in distributed fashion in the lower part 5 and in the upper part 6. Catalyst particles, for instance of platinum and/or palladium, are finally distributed in a liquid, preferably water, with the aerosol producers 11. Additives, such as emulsifiers or means for increasing the viscosity at room temperature, or the like, may optionally be added to the liquid. After the spraying, the suspension or solution, which is in the form of droplets, is dried by heating and made to rise in the containment. The suspension or solution which is intended for the distribution is delivered to the aerosol producers 11 through lines 12 from a common tank 13 that is installed outside the containment 1.

The tank 13 includes a volume of suspension 15 and an agitator 16 in its lower part for homogenizing the suspension. A compressed air line 18 is connected above a surface 17 of the suspension, so that a cushion 19 of propellant gas is formed. A filter 21 that is permeable to the catalyst particles and is intended to retain large agglomerates, is mounted on the bottom 20 of the tank 13. The filter 21 is located in front of an outlet line 22. A diagrammatically illustrated thermal insulation layer 23 is provided on the outside of the tank 13. The tank may also be heated. In order to charge the aerosol producers 11, a valve 25 that is disposed in the course of the line 12 outside the containment 1, is opened. A bypass line 26 around the tank 13 remains closed by a valve 27.

The excess pressure of the propellant gas cushion therefore forces the volume of suspension 15 into the lines 12.

The suspension or solution, which travels through the lines 12, also reaches rows 30 and 31 of nozzles, for instance two rows, which are disposed in the region of the overflow openings 4 and directly act upon a superheated, and optionally hydrogen-containing vapor stream rising from the lower part 5 into the upper part 6 with suspension, as is suggested by arrows 32 and 33. While the suspension is entrained upward from the rows 30, 31 of nozzles by the vapor stream passing through the overflow opening 4, an upwardly oriented distribution flow is generated with the aerosol producers 11 by local heating, as will be described in further detail below. The quantity of the suspension may be adjusted or regulated overall and in its course over time by means of a suitable control of the valve 25. Moreover, by extending a separate compressed air or vapor line up to the rows 30, 31 of nozzles, the aerosol production can advantageously be made finer as will be explained below with regard to FIGS. 4 and 6.

Figure 2:
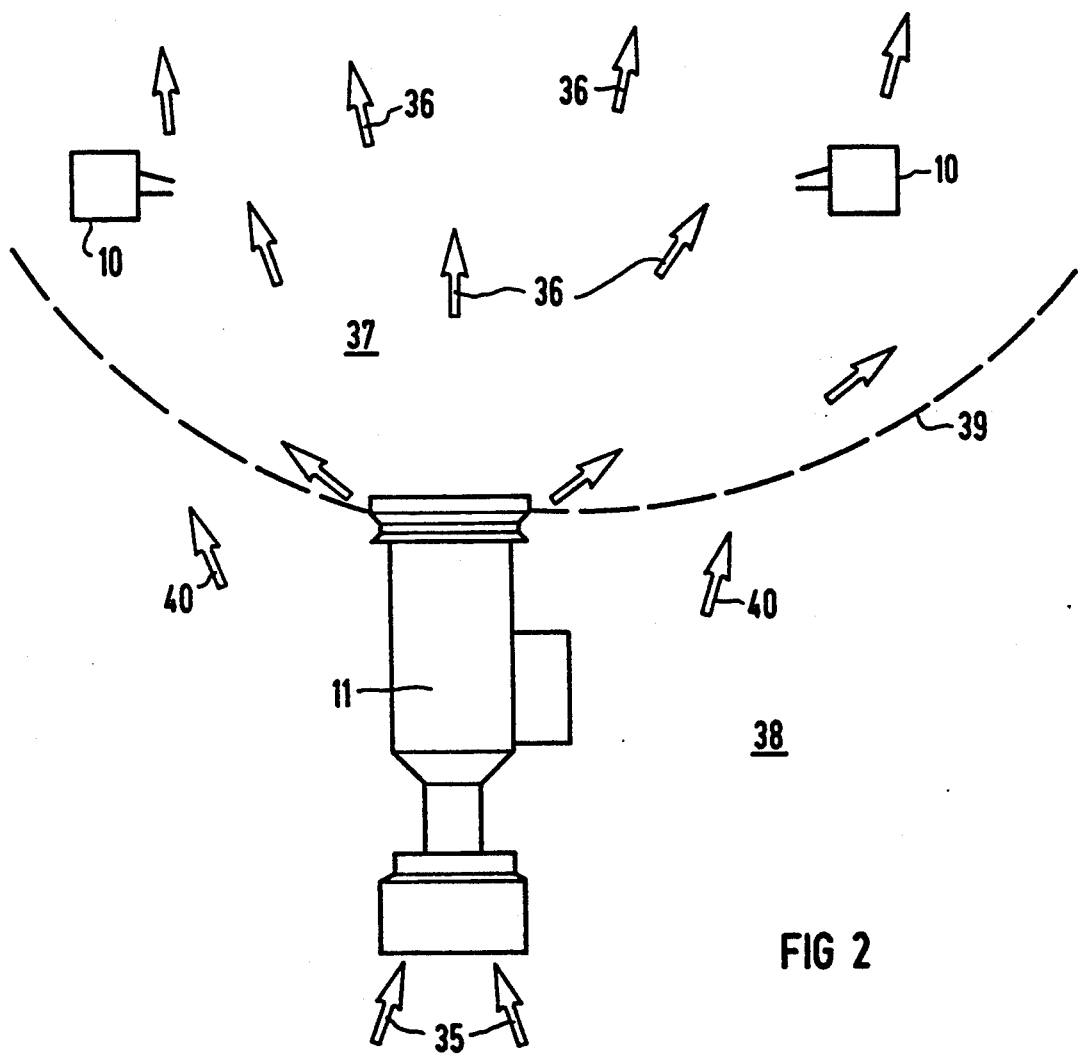
FIG. 2 is a fragmentary, vertical-sectional view of a portion of a containment.

FIG. 2 diagrammatically shows that an aerosol producer 11 which, for instance, has a laterally disposed suspension container, aspirates the hydrogen-containing vapor atmosphere in the containment 1 as indicated by arrows 35. Arrows 36 indicate the way in which the heated aerosol atmosphere rises. The result in the containment 1 is a superheating zone 37, in contrast to a mist zone 38 located below it. A boundary 39 represented by dashed lines is in actuality a transition zone. Arrows 40 symbolically show that a rising flow can be created by the superheating zone 37 outside the aerosol producer 11 as well. The ignition devices 10 are therefore simultaneously acted upon by hydrogen-rich vapor.

Figure 3:
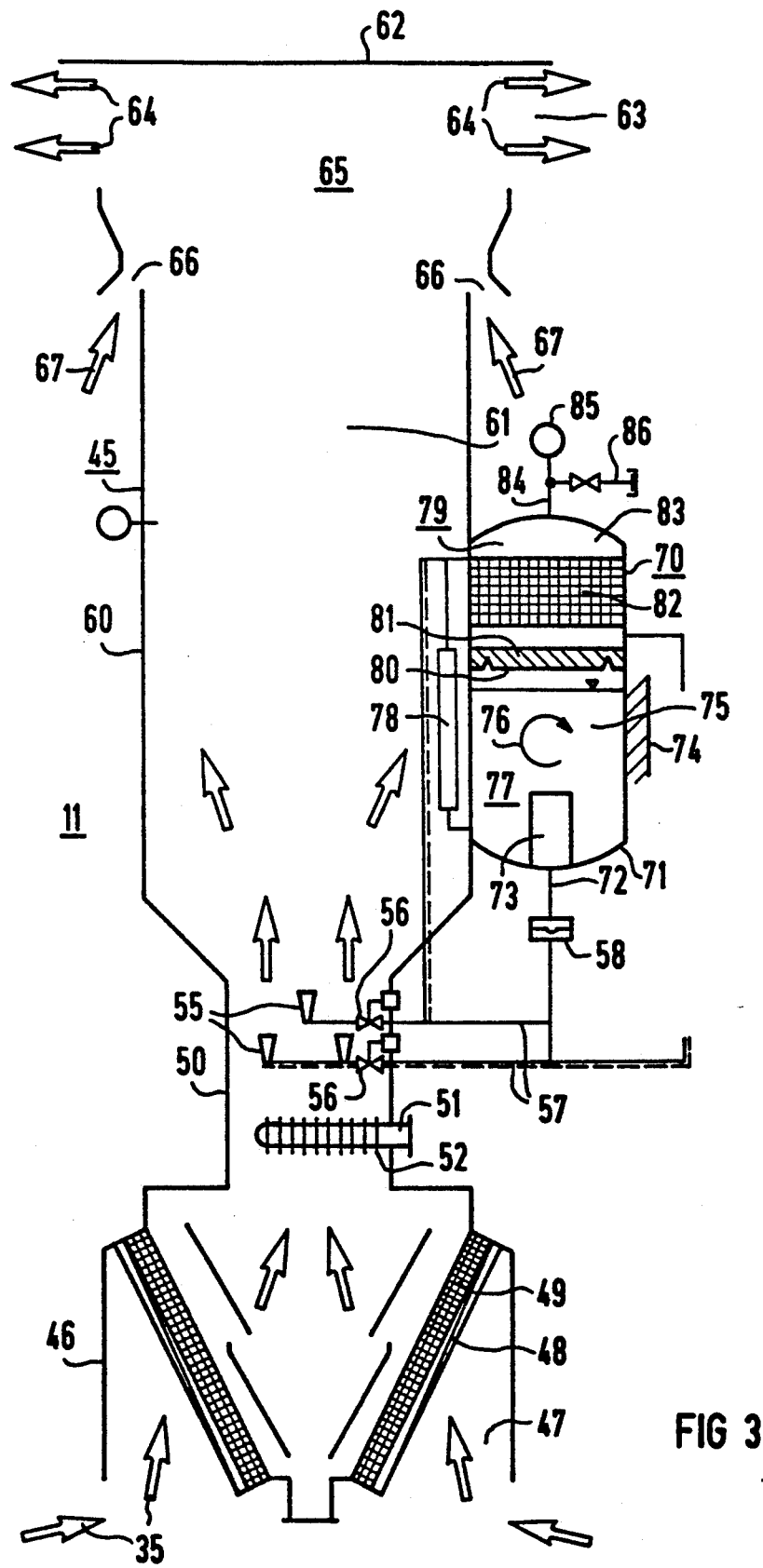
FIG. 3 is a fragmentary, enlarged, vertical-sectional view of a further embodiment for oxidation.

The aerosol producer 11 which is shown in a vertical section in FIG. 3 has a housing in the form of a vertical tube 45 that is stepped back multiple times over its cross section. The vertical tube 45 has an open lower end 46 which forms an inlet opening 47. A prefilter 48 and a superheating or propellant catalyst 49 which are disposed in the inlet opening 47, are inclined obliquely, and conically in the case of a rotationally symmetrical embodiment. With the same embodiment, a heater could also be accommodated there.

A constricted tube part 50 located above the lower end 46 is narrowed to approximately half its cross section and includes a heating cartridge 51 with ribs 52. Nozzles 55 are disposed above the cartridge and can be fed through regulating valves 56. Feed lines 57 lead to a switch element 58 which, for instance, is equipped with a temperature-dependent or catalytic melting member or a pressure-dependent bursting member. In order to provide for fast aerosol production, particularly upon startup, a preheater 78 that is filled with a small quantity of suspension, may be disposed directly in a drying zone 61.

A widened part 60 of the tube 45 above the constricted tube part 50 is twice as long as it is wide, or even longer. The widened part 60 serves to generate buoyancy of the vapor atmosphere carrying the aerosols and also serves to accommodate the drying zone 61. The widened part 60 has an upper end which is closed with a cap 62, as a protection against downdrafts. Below the cap 62 are lateral outlet openings 63, through which the aerosol atmosphere leaves the tube 45 in the direction of arrows 64. A region 65 below the cap 62 is widened somewhat. There, ambient atmosphere aspirated through inlet openings 66 can be admixed, as is suggested by arrows 67. The size of the openings 66 is advantageously adjustable. Partial recirculation of already produced aerosols, and accumulation or settling down in the region of the entire aerosol producer 11, bring about a continuous regeneration of a propellant effect of the superheating catalyst 49.

In the exemplary embodiment of FIG. 3, the aerosol producer 11 disposed in the interior of the containment is coupled directly to a tank 70 that feeds the suspension and propellant vapor lines feed lines 57. The tank 70 has a bottom 71 on which a coarse filter 73 is disposed, above an outlet 72, and the tank has an insulation 74 on the outside. A circulation which is indicated by an arrow 76 can be generated in a liquid 75, for instance by local heating and optionally cooling.

A lower part 77 of the tank 70 is closed off by a bursting disk 80. Catalyst powder 81 rests on the bursting disk 80. This powder 81 is a fine powder, for instance, having a statistical mean diameter of 0.2 to 1.5 $\mu$m, which may be mixed with a fluxing agent of a few nanometers. The remainder of an upper part 79 includes a propellant gas 83, such as nitrogen, at a pressure of 5 to 20 bar, which is settled or accumulated in a sorbent 82, such as a molecular sieve. A connection 84 leading to a pressure measuring unit 85 and a fill line 86 for filling purposes, is mounted on the upper end of the tank 70.

If need be, or in other words in the event of a malfunction where hydrogen is produced, the switch element 58 opens automatically. As a result, the overpressure of the cushion of the propellant gas 83 acts upon the bursting disk 80 and tears it. The catalyst powder 81 travels into the liquid 75 and is carried out with it through the nozzles 55. In the constricted tube part 50, an aerosol mist is produced, having a diameter of catalyst particles of 0.1 to 2 $\mu$m, with liquid droplets that have a diameter of less than 30 $\mu$m. By heating the carrier gas to 50° C. above ambient temperature, the suspension droplets dry to form a fine aerosol within less than one second. The catalyst particles contained in it are finely distributed slowly, and rise continuously, over the interior of the containment 1. The charging can be adapted to the hydrogen content and can be continued even over a relatively long period, such as 24 hours. Alternatively, the catalyst powder may also be stored in the liquid as a suspension with additives, as described above, before it is discharged.

Figure 4:
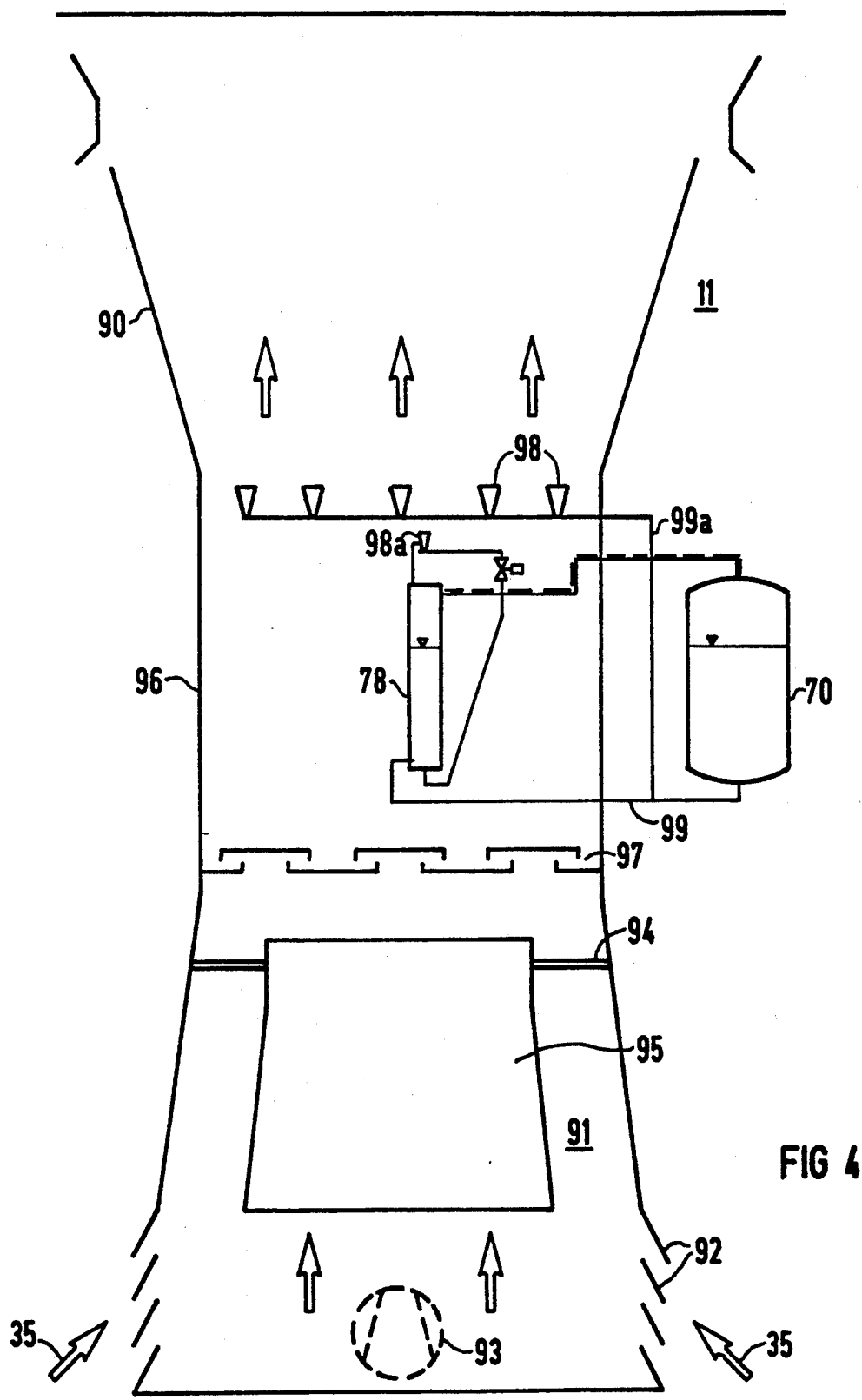
FIG. 4 is a vertical-sectional view of a modification of the embodiment of FIG. 3.

The aerosol producer 11 in FIG. 4 has a tube 90 formed as a diffusor. The tube 90 has a lower, slightly narrowing region 91 that accommodates not only inlet openings 92, but also an auxiliary blower 93, which is especially advantageous for increasing the output. Above the region 91, in a partition 94, is a thermal recombiner or heater 95, for instance an electric heater, so that the separate provision of such a device can be dispensed with as applicable. A preheater 78 is disposed in the region of a constricted tube part 96, above a reflux protector 97. The preheater may be fed with catalyst solution or catalyst suspension through a line 99 connected to the tank 70. A row of nozzles 98 is distributed over the tube cross section above the preheater 78 and can be charged with catalyst solution or suspension through a branch 99a of the line 99. In order to provide fast aerosol production, the slight quantity of suspension in the preheating container 78 can be heated in a short time by the vapor atmosphere that is aspirated in accordance with the arrows 35, is heated to approximately 300° C. to 500° C. as it passes through the heater 95, and can be carried out through a nozzle 98a.

Figure 5:
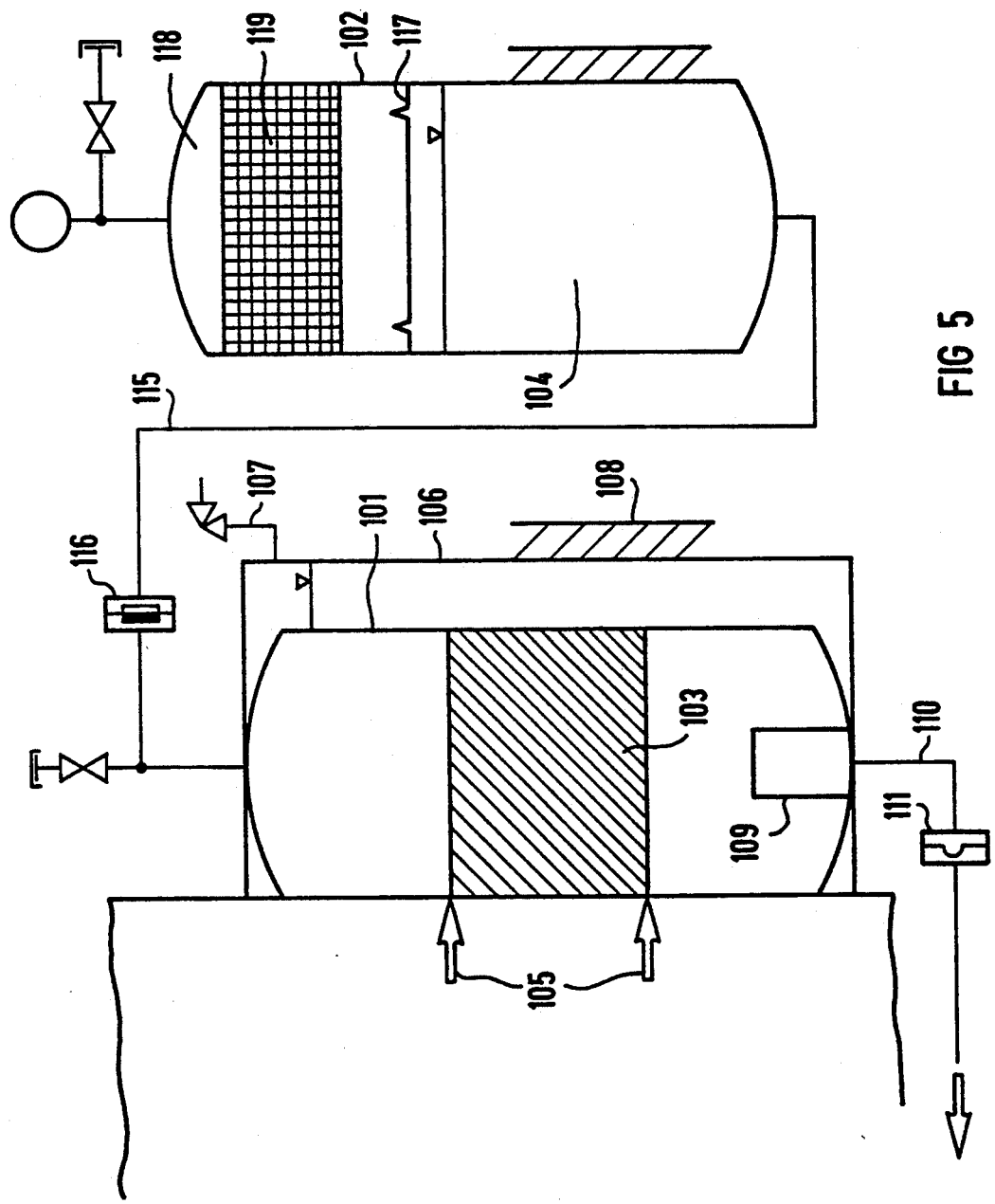
FIG. 5 is a fragmentary, sectional view of an embodiment with separate tanks for liquid used for a solution or suspension and for catalyst particles.

It can be seen in the exemplary embodiment of FIG. 5 that two separate tanks 101 and 102 can be used to furnish catalyst particles 103 or liquid 104. As is indicated by arrows 105, the tank 101 is kept at 20° C. above ambient temperature, for instance, by thermal conduction. The top of a liquid jacket 106 is connected to an overpressure valve 107 as protection against overheating. Thermal insulation of the tank 101 is suggested at reference numeral 108. An outlet 110, which is provided with a preceding coarse filter 109, leads through a membrane switch 111 to a non-illustrated aerosol producer.

A line 115 having a switch element 116 leads from the top of the tank 101 to the underside of the tank 102. This tank is again divided by a membrane or foil 117. Above the liquid 104 is a propellant gas space 118, which contains a molecular sieve 119, for instance, as a sorbent.

If the need arises, the switch element 116 opens automatically. As a result, the overpressure of the propellant gas in the propellant gas space 118 acts upon the foil or membrane 117 and tears it. The membrane switch 111 opens at the same time. The liquid 104 passes through the line 115 into the tank 101, where it is mixed with the catalyst particles 103 to form the solution or suspension. The solution or suspension passes through the line 110 to the non-illustrated aerosol producer or generator.

Figure 6:
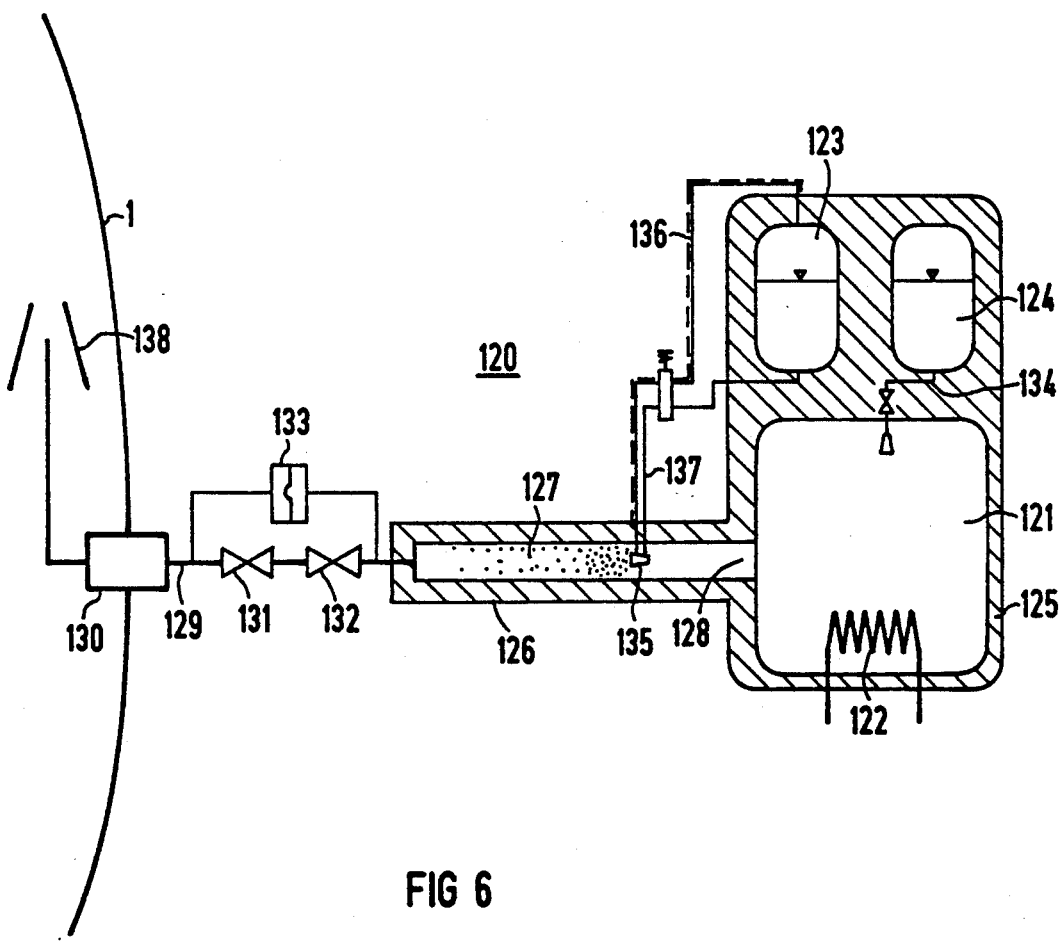
FIG. 6 is a fragmentary, sectional view of a device having a heat accumulator and being disposed outside the containment, for aerosol production.

In the exemplary embodiment of FIG. 6, a device 120 for aerosol production is disposed outside the containment 1. An adequate thermal quantity is continuously prepared in a heat accumulator 121, by means of an electric heater 122. The heat accumulator 121, along with a suspension or solution container 123 and a water prestorage container 124, are disposed in a common heat-insulating casing 125. A horizontally disposed heat-insulated tube 126 is connected to the casing 125 in the region of the heat accumulator 121. The interior of the tube 126 forms a conduit 127, which communicates with the heat accumulator 121 through an opening 128 in the casing 125. A line 129 connected to the tube 126 is carried through a duct 130 into the containment 1. Two valves 131 and 132 that are connected in series are provided in the line 129, and a bursting disk 133 is connected parallel to the valves 131 and 132.

If the need arises, the valves 131 and 132 are opened. The production of propellant vapor is effected by spraying water from the water prestorage container 124 into the heat accumulator 121 through a line 134. The response and feeding of the propellant vapor into the containment 1 can also be effected through the bursting disk 133, by means of the pressure arising upon the vapor generation. In the superheated vapor stream, the suspension is introduced into the containment 1 through the line 129 with the aid of a two-substance nozzle 135 that is disposed in the conduit 127 and communicates with the suspension container 123 through two vertical lines 136 and 137. In the containment, the catalytic aerosols that are dried in the conduit 127, are distributed with the aid of a nozzle-like distributor 138. They rise in the containment 1 and form a floating mist that is catalytically effective in the oxidation.

I claim:

1. A process for oxidation of hydrogen in a containment of a nuclear reactor plant with the aid of finely distributed catalyst particles, which comprises:

spraying catalyst particles in the form of a solution or suspension inside or outside a containment of a nuclear reactor plant;

subsequently drying the sprayed solution or suspension by heating inside or outside the containment to produce aerosols; and introducing the aerosols produced outside into the containment.

2. The process according to claim 1, which comprises causing the aerosols to rise in the interior of the containment.

3. The process according to claim 1, which comprises introducing the suspension or solution into the containment and spraying the suspension or solution, through at least one nozzle fed by a line.

4. The process according to claim 1, which comprises heating the suspension or solution prior to spraying.

5. The process according to claim 1, which comprises producing suspension droplets having a statistical mean diameter of 3 to 30 $\mu$m and resultant solid aerosols of 0.1 to 2 $\mu$m containing the catalyst particles.

6. The process according to claim 1, which comprises releasing the aerosols in a superheated state at a velocity of less than 5 m/s in the containment.

7. The process according to claim 6, which comprises catalytically superheating the aerosols.

8. The process according to claim 1, which comprises heating with a thermal recombiner.

9. The process according to claim 1, which comprises producing the aerosol with a superheater catalyst by delivering aerosols containing catalyst particles to the superheater catalyst, and regenerating the superheater catalyst by accumulation of the catalytic aerosols.

10. The process according to claim 1, which comprises producing the solution or suspension inside the containment immediately before spraying in the containment.

11. The process according to claim 10, which comprises adjusting the solution or suspension with a preheated liquid.

12. The process according to claim 1, which comprises producing the solution or suspension outside the containment.

13. The process according to claim 1, which comprises heating with thermal ignition devices while spraying the solution or suspension in the containment.

14. The process according to claim 1, which comprises producing the solution or suspension by adjusting one of the quantity of liquid being used and the concentration of the catalyst particles being used, as a function of the hydrogen content in the containment.

15. A device for oxidation of hydrogen in a containment of a nuclear reactor plant with the aid of finely distributed catalyst particles, comprising:

a container for receiving catalyst particles in the form of a solution or suspension;

a distributor configuration connected to said container for spraying the solution or suspension inside or outside a containment of a nuclear reactor plant; and a heater for drying the sprayed solution or suspension before the solution or suspension is released into the containment.

16. The device according to claim 15, including a vertical tube having an upper end and having a lower end with an inlet opening formed therein; a cap disposed at said upper end; said upper end of said tube having lateral outlet openings formed therein below said cap; at least one propellant catalyst disposed in said inlet opening; and a nozzle mounted above said propellant catalyst for receiving the solution or suspension.

17. The device according to claim 15, including a vertical tube having an upper end and having a lower end with an inlet opening formed therein; a cap disposed at said upper end; said upper end of said tube having lateral outlet openings formed therein below said cap; a heater disposed in said inlet opening; and a nozzle mounted above said heater for receiving the solution or suspension.

18. The device according to claim 16, including a pressure vessel having a rupture membrane or bursting disk partitioning said pressure vessel into an upper part with a propellant gas or vapor cushion and a lower part with the solution or suspension, and a line connected between said tube and said lower part of said pressure vessel.

19. The device according to claim 17, including a pressure vessel having a rupture membrane or bursting disk partitioning said pressure vessel into an upper part with a propellant gas or vapor cushion and a lower part with the solution or suspension, and a line connected between said tube and said lower part of said pressure vessel.

20. The device according to claim 16, including a preheating container disposed above said at least one propellant catalyst for receiving a small quantity of the suspension or solution.

21. The device according to claim 17, including a preheating container disposed above said heater for receiving a small quantity of the suspension or solution.

22. The device according to claim 15, wherein said distributor configuration has means for spraying the solution or suspension with solid aerosols having a mean diameter of 0.1 to 2 $\mu$m.

* * * * *